United States Patent
Yuuki

(10) Patent No.: US 11,041,984 B2
(45) Date of Patent: Jun. 22, 2021

(54) DISPLAY DEVICE AND AUTOMOBILE

(71) Applicant: Mitsubishi Electric Corporation, Tokyo (JP)

(72) Inventor: Akimasa Yuuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/781,177

(22) Filed: Feb. 4, 2020

(65) Prior Publication Data
US 2020/0257144 A1 Aug. 13, 2020

(30) Foreign Application Priority Data
Feb. 13, 2019 (JP) .............................. JP2019-023723

(51) Int. Cl.
*F21V 8/00* (2006.01)
*G02F 1/13* (2006.01)
*G02F 1/1335* (2006.01)

(52) U.S. Cl.
CPC ......... *G02B 6/0018* (2013.01); *G02F 1/1323* (2013.01); *G02F 1/133509* (2013.01); *G02F 1/133524* (2013.01); *G02F 1/133528* (2013.01)

(58) Field of Classification Search
CPC .............. G02B 6/0018; G02F 1/1323; G02F 1/133509; G02F 1/133524; G02F 1/133528; G02F 2203/62; G02F 2202/14
See application file for complete search history.

(56) References Cited

U.S. PATENT DOCUMENTS

| | | | | |
|---|---|---|---|---|
| 2007/0008456 A1* | 1/2007 | Lesage | ............... | G02B 6/0058 349/62 |
| 2009/0067156 A1* | 3/2009 | Bonnett | ............ | G02F 1/133621 362/97.2 |
| 2009/0185083 A1* | 7/2009 | Ohtoshi | ............. | H04N 21/4307 348/740 |
| 2012/0235891 A1* | 9/2012 | Nishitani | ............. | G02B 3/0056 345/102 |
| 2015/0370078 A1* | 12/2015 | Shang | .................... | G02B 30/27 362/97.1 |
| 2016/0195760 A1* | 7/2016 | Cho | .................. | G02F 1/133606 362/19 |

(Continued)

FOREIGN PATENT DOCUMENTS

JP  H08-094968 A  4/1996

*Primary Examiner* — Phu Vu
(74) *Attorney, Agent, or Firm* — Studebaker & Brackett PC

(57) ABSTRACT

A viewing angle between a wide viewing angle and a narrow viewing angle is switched, and the viewing angle is suppressed from becoming excessively narrow when the viewing angle is switched to the narrow viewing angle. The ultraviolet light guide plate is superimposed on the display panel. A first main surface of the ultraviolet light guide plate is on a side where the pixels are disposed. The film is disposed on the first main surface of the ultraviolet light guide plate. Openings of the film are disposed on an optical path that passes through the pixels and travels in a first direction. Non-opening portions of the film are disposed on an optical path that passes through the pixels and travels in a second direction. The film is made of a photochromic photosensitive material. The ultraviolet light source irradiates an end surface of the ultraviolet light guide plate with ultraviolet light.

6 Claims, 5 Drawing Sheets

(56) References Cited

U.S. PATENT DOCUMENTS

| 2016/0377921 | A1* | 12/2016 | Wang | G02B 6/0068 |
| | | | | 349/68 |
| 2018/0143447 | A1* | 5/2018 | Gao | G02B 6/0016 |
| 2019/0064557 | A1* | 2/2019 | Yanai | G02B 5/3016 |
| 2019/0107755 | A1* | 4/2019 | Chen | G02B 6/0026 |

* cited by examiner

DISPLAY DEVICE AND AUTOMOBILE

BACKGROUND OF THE INVENTION

Field of the Invention

The present invention relates to a display device and an automobile including the display device.

Description of the Background Art

In recent years, automobiles with a display installed have been increasing, and further, automobiles with a passenger seat display have also been increasing. Also, in order to be able to watch movies and the like inside of an automobile, progress has been made in enlargement of a screen of a passenger seat display and improvement in image quality thereof.

The display device provided in a passenger seat display is required to have a wide horizontal viewing angle that allows images to be viewed from both the passenger seat and driver's seat during normal operation but also a narrow horizontal viewing angle that allows images to be viewed from the passenger seat but not to be viewed from the driver's seat when necessary. For this reason, the display device is required to have a function capable of switching the viewing angle in the horizontal direction between a wide viewing angle and a narrow viewing angle.

Such a display device can be realized by a display device including a display panel and a liquid crystal barrier panel. The liquid crystal barrier panel includes a barrier that shields the light. The state of the barrier can be switched between a transmission state that transmits the light and the light shielding state that shields the light.

In the technique described in Japanese Patent Application Laid-Open No. 08-94968, a liquid crystal active barrier panel is disposed in front of a liquid crystal display panel (paragraph 0026). In the liquid crystal display panel, an image for the right eye and an image for the left eye are alternately displayed in the horizontal direction in the drawing (paragraph 0034). In the liquid crystal active barrier panel, a region where a barrier stripe electrode is provided constitutes a barrier stripe (paragraph 0035). The image for the right eye is shielded by the liquid crystal active barrier panel so that the image for the right eye does not enter the left eye (paragraph 0036). The image for the left eye is shielded by the liquid crystal active barrier panel so that the image for the left eye does not enter the right eye (paragraph 0036).

The liquid crystal barrier panel includes a polarizing plate, a glass substrate, and the like. Therefore, in a display device including a display panel and a liquid crystal barrier panel, there is a difficulty in bringing a barrier that shields light close to the display panel. Therefore, in the display device, when the viewing angle is switched to the narrow viewing angle, the viewing angle tends to be excessively narrow.

SUMMARY

An object of the present invention is to provide a display device capable of switching the viewing angle between a wide viewing angle and a narrow viewing angle, and suppressing the viewing angle from becoming excessively narrow when the viewing angle is switched to the narrow viewing angle.

The present invention is directed to a display device. The display device includes a display panel, an ultraviolet light guide plate, a film, and an ultraviolet light source. The display panel includes pixels. The ultraviolet light guide plate is superimposed on the display panel. A first main surface of the ultraviolet light guide plate is on a side on which the pixels are disposed. A second main surface of the ultraviolet light guide plate is on a side opposite to the side on which the pixels are disposed. The film is disposed on the first main surface of the ultraviolet light guide plate. Openings of the film are disposed on an optical path that passes through the pixels and travels in a first direction. Non-opening portions of the film are disposed on an optical path that passes through the pixels and travels in a second direction different from the first direction. The film is made of a photochromic photosensitive material. The ultraviolet light source irradiates an end surface of the ultraviolet light guide plate with ultraviolet light. The present invention is also for an automobile including the display device.

Elements between the display panel and the film serving as a barrier that shields visible light can be reduced. Accordingly, the barrier can be brought closer to the display panel. Accordingly, the display device capable of switching the viewing angle between a wide viewing angle and a narrow viewing angle, and suppressing the viewing angle from becoming excessively narrow when the viewing angle is switched to a narrow viewing angle is provided.

These and other objects, features, aspects and advantages of the present disclosure will become more apparent from the following detailed description of the present disclosure when taken in conjunction with the accompanying drawings.

DESCRIPTION OF THE PREFERRED EMBODIMENTS

1. Embodiment 1

1.1 Display Device

Figure 1:
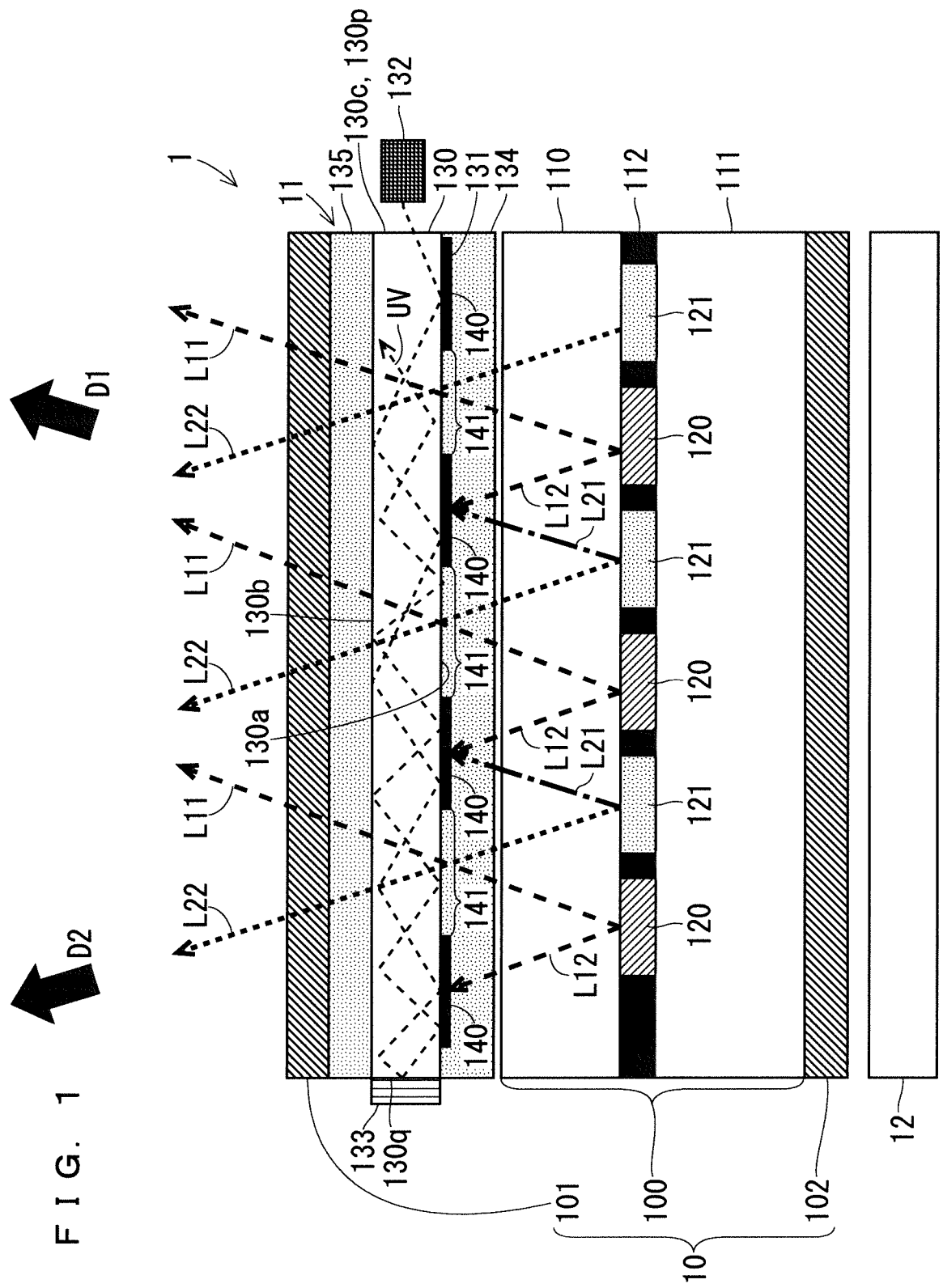
FIG. 1 is a cross-sectional view schematically illustrating a display device of Embodiment 1.

FIG. 1 is a cross-sectional view schematically illustrating a display device of Embodiment 1.

A display device 1 according to Embodiment 1 illustrated in FIG. 1 is a vehicle-mounted display device mounted on an automobile. The display device 1 may be a display device other than the vehicle-mounted display device.

The display device 1 includes a display panel 10, a barrier panel 11, and a backlight 12, as illustrated in FIG. 1. The display device 1 may include elements other than these elements.

The display panel 10, the barrier panel 11, and the backlight 12 are superimposed on one another. The harrier panel 11 is inserted into the display panel 10. The backlight 12 is disposed on the back side of the display panel 10.

The display panel 10 is a liquid crystal display panel. Therefore, the display device 1 is a liquid crystal display device. The display panel 10 may be a display panel other than the liquid crystal display panel. Therefore, the display device 1 may be a display device other than the liquid crystal display device. For example, the display panel 10 may be an organic electroluminescence (EL) display panel. Therefore, the display device 1 may be an organic EL display panel. When the display panel 10 is an organic EL display panel and the display device 1 is an organic EL display device, the backlight 12 is not necessary.

The backlight 12 emits light. Portion of the emitted light passes through the display panel 10 and the barrier panel 11. The display panel 10 has an in-plane distribution of light transmittance corresponding to an input image signal. The barrier panel 11 has dependence on observation direction of the light transmittance according to an input control signal. As a result, an image corresponding to the input image signal, the input control signal and the observation direction is displayed on the display device 1.

1.2 Display Panel

As illustrated in FIG. 1, the display panel 10 includes a liquid crystal cell 100, a first polarizing plate 101, and a second polarizing plate 102.

The first polarizing plate 101 and the second polarizing plate 102 are superimposed on the liquid crystal cell 100. The first polarizing plate 101 is disposed on the front side of the liquid crystal cell 100 and is disposed on the forefront. The second polarizing plate 102 is disposed on the rear side of the liquid crystal cell 100.

The light that passes through the display panel 10 sequentially passes through the second polarizing plate 102, the liquid crystal cell 100, and the first polarizing plate 101. The second polarizing plate 102 selectively transmits polarized light having a specific polarization direction. The liquid crystal cell 100 has an in-plane distribution of the amount of change in the polarization direction corresponding to the image signal input to the liquid crystal cell 100. The second polarizing plate 102 selectively transmits polarized light having a specific polarization direction. As a result, an image corresponding to the image signal input to the liquid crystal cell 100 is displayed on the display panel 10.

As illustrated in FIG. 1, the liquid crystal cell 100 includes a first transparent substrate 110, a second transparent substrate 111, and a liquid crystal layer 112. The liquid crystal layer 112 includes first pixels 120 and second pixels 121, as illustrated in FIG. 1.

The first pixels 120 are pixels for displaying an image that is visually recognized when the display panel 10 is observed from the passenger seat. The second pixels 121 are pixels for displaying an image that is visually recognized when the display panel 10 is observed from the driver's seat.

The liquid crystal layer 112 is held between the first transparent substrate 110 and the second transparent substrate 111. The first pixels 120 and the second pixels 121 are disposed in an alternate state in a horizontal direction. Driving voltages corresponding to the image signal input to the liquid crystal cell 100 are applied to the first pixels 120 by first transparent electrodes divided from each other. Driving voltages corresponding to the image signal input to the liquid crystal cell 100 are applied to the second pixels 121 by second transparent electrodes divided from each other. The first pixels 120 and the second pixels 121 have an amount of change of the polarization direction according to the applied drive voltages. Accordingly, the liquid crystal layer 112 has an in-plane distribution of the amount of change in the polarization direction corresponding to the image signal input to the liquid crystal cell 100.

1.3 Barrier Panel

As illustrated in FIG. 1, the barrier panel 11 includes an ultraviolet light guide plate 130, a film 131, and an ultraviolet light source 132.

The barrier panel 11 is superimposed on the display panel 10, is disposed on the front side of the liquid crystal cell 100, and is sandwiched between the liquid crystal cell 100 and the first polarizing plate 101. Accordingly, the ultraviolet light guide plate 130 and the film 131 are superimposed on the display panel 10, and are sandwiched between the liquid crystal cell 100 and the first polarizing plate 101. The barrier panel 11 may be disposed on the rear side of the liquid crystal cell 100, or may also be sandwiched between the liquid crystal cell 100 and the second polarizing plate 102. Accordingly, the ultraviolet light guide plate 130 and the film 131 may be sandwiched between the liquid crystal cell 100 and the second polarizing plate 102.

The ultraviolet light guide plate 130 has a first main surface 130a, a second main surface 130b, and an end surface 130c. The first main surface 130a is on the side where the first pixels 120 and the second pixels 121 are disposed. The second main surface 130b is on the side opposite to the side where the first pixels 120 and the second pixels 121 are disposed. The end surface 130c connects the first main surface 130a and the second main surface 130b.

The ultraviolet light guide plate 130 is desirably made of a material that does not cause birefringence and hardly absorbs ultraviolet light, such as glass.

The film 131 is disposed on the first main surface 130a of the ultraviolet light guide plate 130.

The film 131 is a thin film. The film 131 is made of a photochromic photosensitive material. The photochromic photosensitive material constituting the film 131 is a photochromic photosensitive material that increases an absorption rate of visible light when irradiated with ultraviolet light, and is spirooxazine, tetracene, or the like.

The ultraviolet light source 132 faces the end surface 130c of the ultraviolet fight guide plate 130 and irradiates the end surface 130c of the ultraviolet light guide plate 130 with ultraviolet light UV.

When the ultraviolet light source 132 irradiates the end surface 130c of the ultraviolet light guide plate 130 with ultraviolet light UV, the irradiated ultraviolet light UV is incident on the end surface 130c of the ultraviolet light guide plate 130. The incident ultraviolet light UV propagates through inside the ultraviolet light guide plate 130 while being repeatedly totally reflected by the first main surface 130a and the second main surface 130b of the ultraviolet light guide plate 130, and spreads throughout the inside of the ultraviolet light guide plate 130. The film 131 is irradiated with the ultraviolet light UV during the process. As a result, the absorption rate of visible light of the film 131 is increased, and the state of the film 131 is changed from the transmission state in which visible light is transmitted to the light shielding state in which visible light is absorbed.

A first direction D1 illustrated in FIG. 1 is a passenger seat direction from the display device 1 toward the passenger seat. Also, a second direction D2 illustrated in FIG. 1 is a driver's seat direction from the display device 1 toward the driver's seat.

The film 131 has openings 141 disposed on the optical path that passes through the first pixels 120 and travels in the first direction D1, and non-opening portions 140 disposed on the optical path that passes through the first pixels 120 and travels in the second direction D2 that is different from the first direction D1. Thereby, when the state of the film 131 is in the transmission state, the light L11 that passes through the first pixels 120 and travels in the first direction D1 passes through the openings 141 and reaches the passenger seat. Further, the light L12 that passes through the first pixels 120 and travels in the second direction D2 passes through the non-opening portions 140 and reaches the driver's seat. Meanwhile, when the state of the film 131 is in the light shielding state, the light L11 that passes through the first pixels 120 and travels in the first direction D1 passes through the openings 141 and reaches the passenger seat. However, the light L12 that passes through the first pixels 120 and travels in the second direction D2 does not pass through the non-opening portions 140 and does not reach the driver's seat.

The openings 141 are disposed on the optical path that passes through the second pixels 121 and travels in the second direction D2. The non-opening portions 140 are disposed on the optical path that passes through the second pixels 121 and travels in the first direction D1. Thereby, when the state of the film 131 is in the transmission state, the light L22 that passes through the second pixels 121 and travels in the second direction D2 passes through the openings 141 and reaches the driver's seat. Further, the light L21 that passes through the second pixels 121 and travels in the first direction D1 passes through the non-opening portions 140 and reaches the passenger seat. Meanwhile, when the state of the film 131 is in the light shielding state, the light L22 that passes through the second pixels 121 and travels in the second direction D2 passes through the openings 141 and reaches the driver's seat. However, the light L21 that passes through the second pixels 121 and travels in the first direction D1 does not pass through the non-opening portions 140 and does not reach the passenger seat.

A plurality of non-opening portions 140 form a band-like pattern or a staggered pattern.

The barrier panel 11 desirably includes an ultraviolet reflection film 133.

The ultraviolet light source 132 irradiates a first region 130p of the end surface 130c of the ultraviolet light guide plate 130 with ultraviolet light UV. The ultraviolet reflection film 133 is disposed on a second region 130q different from the first region 130p of the end surface 130c of the ultraviolet light guide plate 130, and is attached to the second region 130q of the end surface 130c of the ultraviolet light guide plate 130.

The ultraviolet reflection film 133 reflects the ultraviolet light UV that propagates through inside the ultraviolet light guide plate 130 and reaches the second region 130q of the end surface 130c of the ultraviolet light guide plate 130. Thereby, the ultraviolet light UV is suppressed from being emitted from the second region 130q of the end face 130c of the ultraviolet light guide plate 130; therefore, utilization efficiency of the ultraviolet light UV is improved.

The barrier panel 11 desirably includes a first ultraviolet absorption layer 134 and a second ultraviolet absorption layer 135.

The first ultraviolet absorption layer 134 and the second ultraviolet absorption layer 135 are disposed on the first main surface 130a and the second main surface 130b of the ultraviolet light guide plate 130, respectively. The first ultraviolet absorption layer 134 is disposed so as to be superimposed on the film 131.

The first ultraviolet absorption layer 134 and the second ultraviolet absorption layer 135 sandwich the ultraviolet light guide plate 130, transmit visible light, and absorb ultraviolet light. The first ultraviolet absorption layer 134 and the second ultraviolet absorption layer 135 desirably have a refractive index that is smaller than the refractive index of the ultraviolet light guide plate 130 by 0.2 or more. Accordingly, when the ultraviolet light UV propagates through inside the ultraviolet light guide plate 130 while being repeatedly totally reflected by the first main surface 130a and the second main surface 130b of the ultraviolet light guide plate 130, the loss of ultraviolet light UV within the ultraviolet light guide plate 130 is reduced.

The ultraviolet light guide plate 130, the film 131, the first ultraviolet absorption layer 134, and the second ultraviolet absorption layer 135 are desirably made of a material that does not cause birefringence. Thereby, the occurrence of black display unevenness in the display panel 10 is ensured to be suppressed.

Note that the first pixels 120 may be pixels for displaying an image visually recognized when the display panel 10 is observed from the driver's seat direction. Also, the second pixels 121 may be pixels for displaying an image visually recognized when the display panel 10 is observed from the passenger seat direction. Further, the first direction D1 may be the driver's seat direction. Also, the first direction D2 may be the passenger seat direction.

1.4 Operation of Display Device

The ultraviolet light source 132 is turned off and turned on in accordance with the control signal input to the barrier panel 11.

When the ultraviolet light source 132 is turned off, the state of the film 131 becomes the transmission state, and the barrier that shields visible light disappears. Therefore, the light L11 that passes through the first pixels 120 and travels in the first direction D1 passes through the openings 141 and reaches the passenger seat. Further, the light L12 that passes through the first pixels 120 and travels in the second direction D2 passes through the non-opening portions 140 and reaches the driver's seat. Further, the light L22 that passes through the second pixels 121 and travels in the second direction D2 passes through the openings 141 and reaches the driver's seat. Further, the light L21 that passes through the second pixels 121 and travels in the first direction D1 passes through the non-opening portions 140 and reaches the passenger seat. Therefore, both the image displayed by the first pixels 120 and the image displayed by the second pixels 121 can be viewed from both the passenger seat and the driver's seat. Therefore, the same wide viewing angle, high resolution, and high luminance as in an ordinary display device an be obtained.

Meanwhile, when the ultraviolet light source 132 is turned on, the state of the film 131 becomes the light shielding state, and the barrier that shields visible light appears. Therefore, the light L11 that passes through the first pixels 120 and travels in the first direction D1 passes through the openings 141 and reaches the passenger seat. However, the light L12 that passes through the first pixels 120 and travels in the second direction D2 does not pass through the non-opening portions 140 and does not reach the driver's seat. Further, the light L22 that passes through the second pixels 121 and travels in the second direction D2 passes through the openings 141 and reaches the driver's seat. However, the light L21 that passes through the second pixels 121 and travels in the first direction D1 does not pass through the non-opening portions 140 and does not reach the passenger seat. Therefore, the viewing angle becomes narrow, and while the image which is displayed by the first pixels 120 can be visually recognized from the passenger seat, the image cannot be visually recognized from the driver's seat. Also, while the image displayed by the second pixels 121 can be visually recognized from the driver's seat, the image cannot be visually recognized from the passenger seat. Therefore, the image visually recognized from the passenger seat and the image visually recognized from the driver's seat can be made different from each other. For example, by setting the image displayed by the first pixels 120 as an entertainment image and the image displayed by the second pixels 121 as a black image, the entertainment image that disturbs driving can be viewed only from the passenger seat.

1.5 Effects of Embodiment 1

According to the invention of Embodiment 1, the number of elements between the display panel 10 and the film 131 serving as a barrier that shields visible light can be reduced. For example, a glass plate, a polarizing plate, etc. can be omitted. Accordingly, the barrier can be brought closer to the display panel 10. Accordingly, the display device 1 capable of switching the viewing angle between a wide viewing angle and a narrow viewing angle, and suppressing the viewing angle from becoming excessively narrow when the viewing angle is switched to the narrow viewing angle is provided.

Further, according to the invention of Embodiment 1, the first ultraviolet absorption layer 134 that absorbs ultraviolet light is disposed on the first main surface 130a of the ultraviolet light guide plate 130 so as to be superimposed on the film 131, and the second ultraviolet absorption layer 135 that absorbs ultraviolet light is disposed on the second main surface 130b of the ultraviolet light guide plate 130. Accordingly, the state of the film 131 is suppressed from becoming the light shielding state by the film 131 being irradiated with ultraviolet light contained in the light emitted from the backlight 12, external light, and the like. Thereby the appearance of a barrier that shields visible light by the ultraviolet light is suppressed.

2. Embodiment 2

Figure 2:
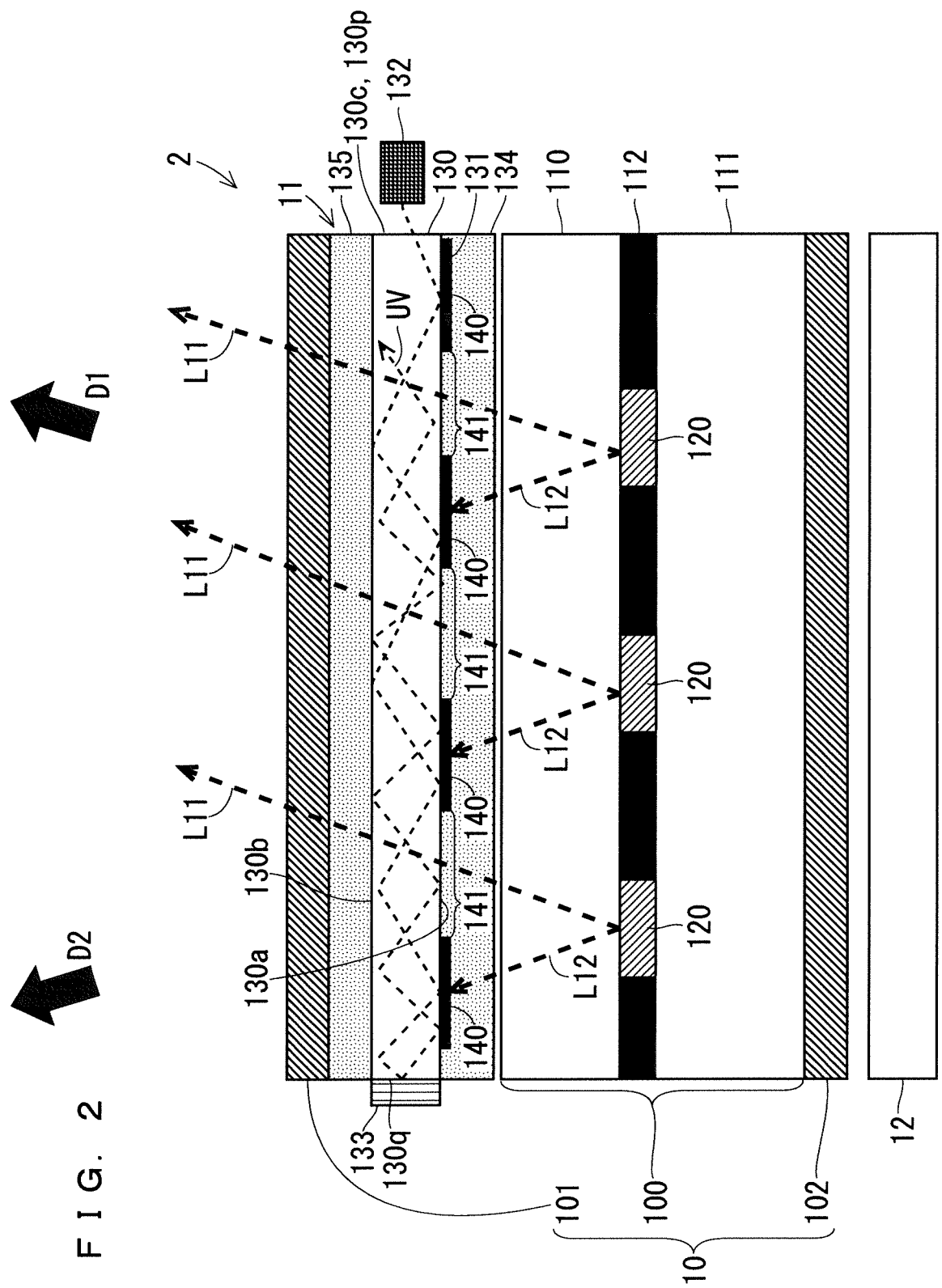
FIG. 2 is a cross-sectional view schematically illustrating a display device of Embodiment 2.

FIG. 2 is a cross-sectional view schematically illustrating a display device of Embodiment 2.

A display device 2 of Embodiment 2 illustrated in FIG. 2 differs from the display device 1 of Embodiment 1 illustrated in FIG. 1 mainly by the following differences.

In the display device 1 of Embodiment 1, the liquid crystal layer 112 includes the first pixels 120 and the second pixels 121. On the other hand, in the display device 2 of Embodiment 2, the liquid crystal layer 112 includes the first pixels 120 but does not include the second pixels 121.

The first pixels 120 are arranged in a horizontal direction. Driving voltages corresponding to the image signal input to the liquid crystal cell 100 are applied to the first pixels 120 by first transparent electrodes divided from each other.

The film 131 has openings 141 disposed on the optical path that passes through the first pixels 120 and travels in the first direction. D1, and non-opening portions 140 disposed on the optical path that passes through the first pixels 120 and travels in the second direction D2 that is different from the first direction D1. Thereby, when the state of the film 131 is in the transmission state, the light L11 that passes through the first pixels 120 and travels in the first direction D1 passes through the openings 141 and reaches the passenger seat. Further, the light L12 that passes through the first pixels 120 and travels in the second direction D2 passes through the non-opening portions 140 and reaches the driver's seat. Meanwhile, when the state of the film 131 is in the light shielding state, the light L11 that passes through the first pixels 120 and travels in the first direction D1 passes through the openings 141 and reaches the passenger seat. However, the light L12 that passes through the first pixels 120 and travels in the second direction D2 does not pass through the non-opening portions 140 and does not reach the driver's seat.

When the ultraviolet light source 132 is turned off, the state of the film 131 becomes the transmission state, and the barrier that shields visible light disappears. Therefore, the light L11 that passes through the first pixels 120 and travels in the first direction D1 passes through the openings 141 and reaches the passenger seat. Further, the light L12 that passes through the first pixels 120 and travels in the second direction D2 passes through the non-opening portions 140 and reaches the driver's seat. Therefore, the image displayed by the first pixels 120 can be viewed from both the passenger seat and the driver's seat. Therefore, the same wide viewing angle, high resolution, and high luminance as in an ordinary display device can be obtained.

Meanwhile, when the ultraviolet light source 132 is turned on, the state of the film 131 becomes the light shielding state, and the barrier that shields visible light appears. Therefore, the light L11 that passes through the first pixels 120 and travels in the first direction D1 passes through the openings 141 and reaches the passenger seat. However, the light L12 that passes through the first pixels 120 and travels in the second direction D2 does not pass through the non-opening portions 140 and does not reach the driver's seat. Therefore, the viewing angle becomes narrow, and while the image which is displayed by the first pixels 120 can be visually recognized from the passenger seat, the image cannot be visually recognized from the driver's seat.

For configurations not described, the configuration adopted in the display device 1 of Embodiment 1 is also adopted in the display device 2 of Embodiment 2. The configuration adopted in the modification of the display device 1 of Embodiment 1 may be adopted in the display device 2 of Embodiment 2. For example, the display device 2 may be a display device other than the vehicle-mounted display device. Further, the display panel 10 may be a display panel other than the liquid crystal display panel, and the display device 1 may be a display device other than the liquid crystal display device. The barrier panel 11 may be disposed on the rear side of the liquid crystal cell 100, or may also be sandwiched between the liquid crystal cell 100 and the second polarizing plate 102.

According to the invention of Embodiment 2, as in the same with the invention of Embodiment 1, the number of elements between the display panel 10 and the film 131 serving as a barrier that shields visible light can be reduced. Accordingly, the barrier can be brought closer to the display panel 10. Accordingly, the display device 2 capable of switching the viewing angle between a wide viewing angle and a narrow viewing angle, and suppressing the viewing angle from becoming excessively narrow when the viewing angle is switched to the narrow viewing angle is provided.

Further, according to the invention of Embodiment 2, as in the same with the invention of Embodiment 1, the first ultraviolet absorption layer 134 that absorbs ultraviolet light is disposed on the first main surface 130a of the ultraviolet light guide plate 130 so as to be superimposed on the film 131, and the second ultraviolet absorption layer 135 that absorbs ultraviolet light is disposed on the second main surface 130b of the ultraviolet light guide plate 130. Accordingly, the state of the film 131 is suppressed from becoming the light shielding state by the film 131 being irradiated with ultraviolet light contained in the light emitted from the backlight 12, external light, and the like. Thereby the appearance of a barrier that shields visible light by the ultraviolet light is suppressed.

In addition, according to the invention of Embodiment 2, unlike the invention of Embodiment 1, the number of pixels is halved, the pixels are easily driven, and the member cost is reduced.

3. Embodiment 3

Figure 3:
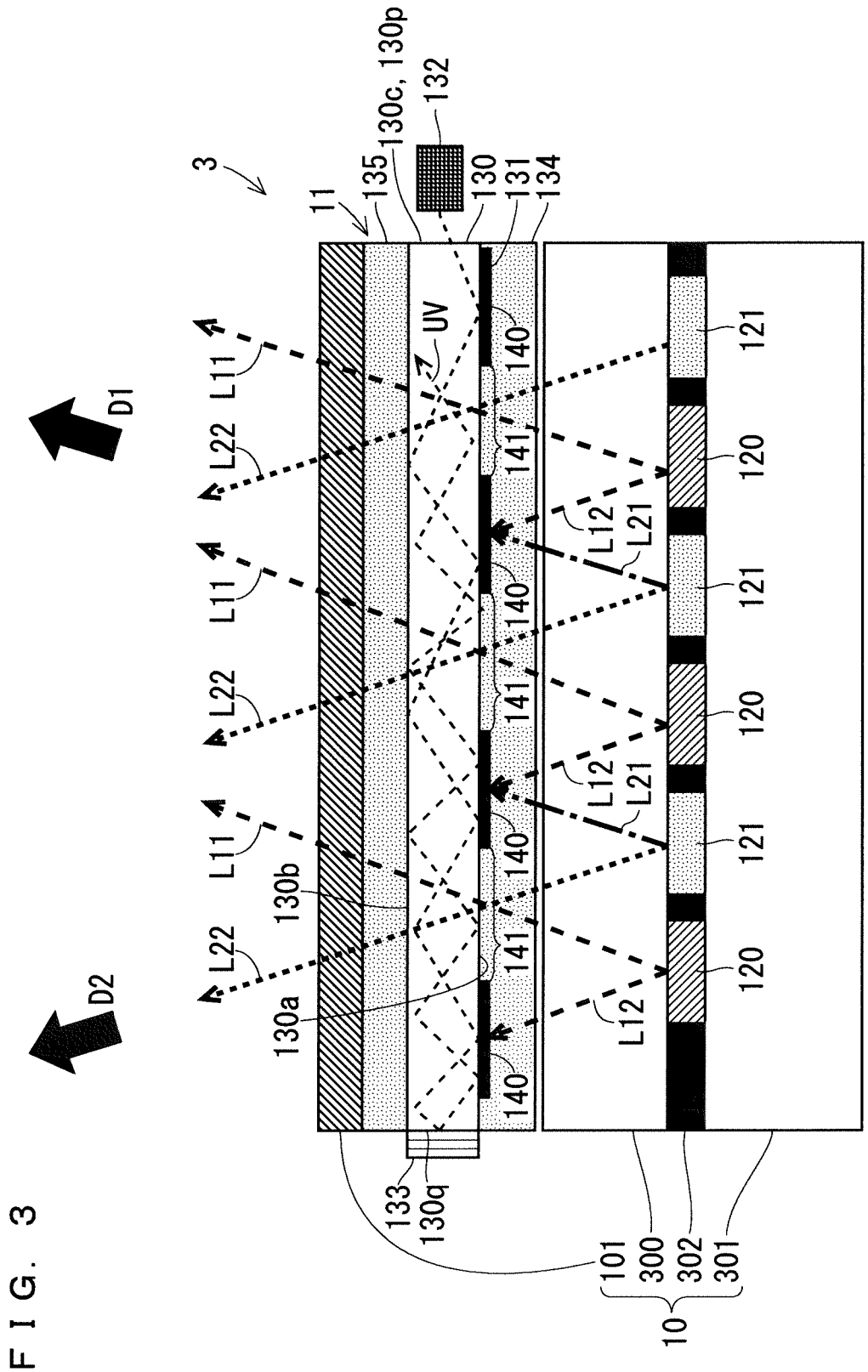
FIG. 3 is a cross-sectional view schematically illustrating a display device of Embodiment 3.

FIG. 3 is a cross-sectional view schematically illustrating a display device of Embodiment 3.

A display device 3 of Embodiment 3 illustrated in FIG. 3 differs from the display device 1 of Embodiment 1 illustrated in FIG. 1 mainly by the following differences.

In the display device 1 of Embodiment 1, the display panel 10 is a liquid crystal display panel and the display device 1 is a liquid crystal display device. Whereas, in the display device 3 of Embodiment 3, the display panel 10 is an organic EL display panel and the display device 3 is an organic EL display device.

As illustrated in FIG. 3, the display panel 10 includes a transparent cover 300, a substrate 301, and an organic EL light emitting layer 302. The organic EL light emitting layer 302 has first pixels 120 and second pixels 121 as illustrated in FIG. 3.

The organic EL light emitting layer 302 is held between the transparent cover 300 and the substrate 301. The first pixels 120 and the second pixels 121 are arranged in an alternate state in a horizontal direction. Driving voltages corresponding to the image signal input to the display panel 10 are applied to the first pixels 120 by first transparent electrodes divided from each other. Driving voltages corresponding to the image signal input to the display panel 10 is applied to the second pixels 121 by second transparent electrodes divided from each other. The first pixels 120 and the second pixels 121 emit light having an intensity corresponding to the applied drive voltages.

The film 131 has openings 141 disposed on the optical path that passes through the first pixels 120 and travels in the first direction D1, and non-opening portions 140 disposed on the optical path that passes through the first pixels 120 and travels in the second direction D2 that is different from the first direction D1. Thereby, when the state of the film 131 is in the transmission state, the light L11 that passes through the first pixels 120 and travels in the first direction D1 passes through the openings 141 and reaches the passenger seat. Further, the light L12 that passes through the first pixels 120 and travels in the second direction D2 passes through the non-opening portions 140 and reaches the driver's seat, Meanwhile, when the state of the film 131 is in the light shielding state, the light L11 that passes through the first pixels 120 and travels in the first direction D1 passes through the openings 141 and reaches the passenger seat. However, the light L12 that passes through the first pixels 120 and travels in the second direction D2 does not pass through the non-opening portions 140 and does not reach the driver's seat.

The openings 141 are disposed on the optical path that passes through the second pixels 121 and travels in the second direction D2. The non-opening portions 140 are disposed on the optical path that passes through the second pixels 121 and travels in the first direction D1. Therefore, when the state of the film 131 is in the transmission state, the light L22 that travels from the second pixels 121 in the second direction D2 passes through the openings 141 and reaches the driver's seat. Further, the light L21 that travels from the second pixels 121 in the first direction D1 passes through the non-opening portions 140 and reaches the passenger seat. Meanwhile, when the state of the film 131 is in the light shielding state, the light L22 that travels from the second pixels 121 in the second direction D2 passes through the openings 141 and reaches the driver's seat. However, the light L21 that travels from the second pixels 121 in the first direction D1 does not pass through the non-opening portions 140 and does not reach the passenger seat.

When the ultraviolet light source 132 is turned off, the state of the film 131 becomes the transmission state, and the barrier that shields visible light disappears, Therefore, as described above, the light L11 that travels from the first pixels 120 in the first direction D1 passes through the openings 141 and reaches the passenger seat. Further, the light L12 that travels from the first pixels 120 in the second direction D2 passes through the non-opening portions 140 and reaches the drivers seat. Further, the light L22 that travels from the second pixels 121 in the second direction D2 passes through the openings 141 and reaches the driver's seat. Further, the light L21 that travels from the second pixels 121 in the first direction D1 passes through the non-opening portions 140 and reaches the passenger seat, Therefore, both the images displayed by the first pixels 120 and the image displayed by the second pixels 121 can be viewed from both the passenger seat and the driver's seat. Therefore, the same wide viewing angle, high resolution, and high luminance as in an ordinary display device can be obtained.

Meanwhile, when the ultraviolet light source 132 is turned on, the state of the film 131 becomes the light shielding state, and the barrier that shields visible light appears. Therefore, as described above, the light L11 that travels from the first pixels 120 in the first direction D1 passes through the openings 141 and reaches the passenger seat. However, the light L12 that travels from the first pixels 120 in the second direction D2 does not pass through the non-opening portions 140 and does not reach the driver's seat. Further, the light L22 that travels from the second pixels 121 in the second direction D2 passes through the openings 141 and reaches the driver's seat. However, the light L21 that travels from the second pixels 121 in the first direction D1 does not pass through the non-opening portions 140 and does not reach the passenger seat. Therefore, the viewing angle becomes narrow, and while the image which is displayed by the first pixels 120 can be visually recognized from the passenger seat, the image cannot be visually recognized from the driver's seat. Also, while the image displayed by the second pixels 121 can be visually recognized from the driver's seat, the image cannot be visually recognized from the passenger seat.

For configurations not described, the configuration adopted in the display device 1 of Embodiment 1 is also adopted in the display device 3 of Embodiment 3. The configuration adopted in the modification of the display device 1 of Embodiment 1 may be adopted in the display device 3 of Embodiment 3. For example, the display device 3 may be a display device other than the vehicle-mounted display device.

According to the invention of Embodiment 3, as in the same with Embodiment 1, the number of elements between the display panel 10 and the film 131 serving as a barrier that shields visible light can be reduced. Accordingly, the barrier can be brought closer to the display panel 10. Accordingly, the display device 3 capable of switching the viewing angle between a wide viewing angle and a narrow viewing angle, and suppressing the viewing angle from becoming excessively narrow when the viewing angle is switched to the narrow viewing angle is provided.

Further, according the invention of Embodiment 3, as in the same with the invention of Embodiment 1, the first ultraviolet absorption layer 134 that absorbs ultraviolet light is disposed on the first main surface 130a of the ultraviolet light guide plate 130 so as to be superimposed on the film 131, and the second ultraviolet absorption layer 135 that absorbs ultraviolet light is disposed on the second main surface 130b of the ultraviolet light guide plate 130. Accordingly, the state of the film 131 is suppressed from becoming the light shielding state by the film 131 being irradiated with ultraviolet light contained in external light, and the like. Thereby the appearance of a barrier that shields visible light by the ultraviolet light is suppressed.

4. Embodiment 4

Figure 4:
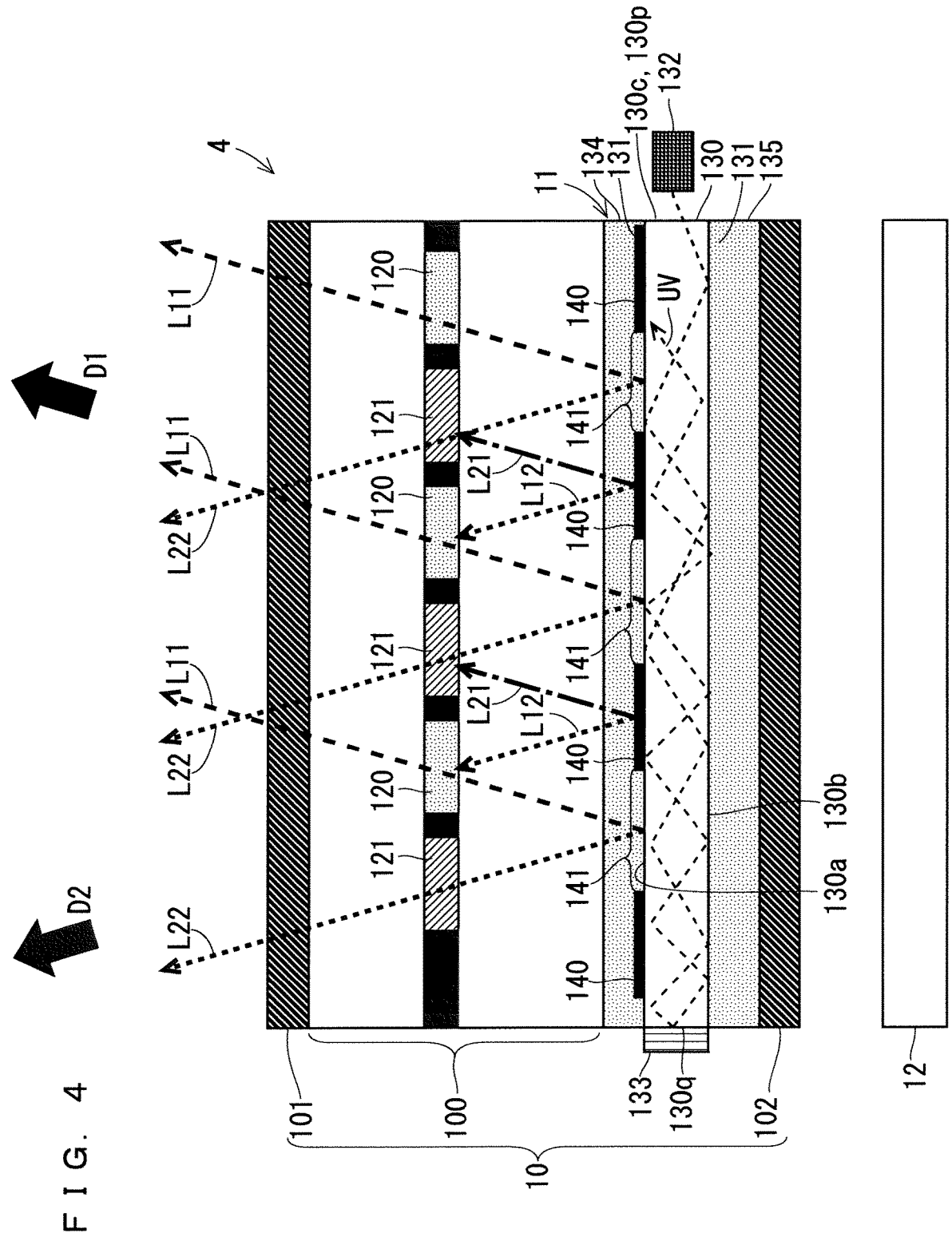
FIG. 4 is a cross-sectional view schematically illustrating a display device of Embodiment 4.

FIG. 4 is a cross-sectional view schematically illustrating a display device of Embodiment 4.

A display device 4 of Embodiment 4 illustrated in FIG. 4 differs from the display device 1 of Embodiment 1 illustrated in FIG. 1 mainly by the following differences.

In the display device 1 according to Embodiment 1, the barrier panel 11 is disposed on the front side of the liquid crystal cell 100 and is sandwiched between the liquid crystal cell 100 and the first polarizing plate 101. Whereas, in the display device 4 according to Embodiment 4, the barrier panel 11 is disposed on the rear side of the liquid crystal cell 100 and is sandwiched between the liquid crystal cell 100 and the second polarizing plate 102.

The film 131 has openings 141 disposed on the optical path that passes through the first pixels 120 and travels in the first direction D1, and non-opening portions 140 disposed on the optical path that passes through the first pixels 120 and travels in the second direction D2 that is different from the first direction D1. Thereby, when the s at of the film 131 is in the transmission state, the light L11 that passes through the first pixels 120 and travels in the first direction D1 passes through the openings 141 and reaches the passenger seat. Further, the light L12 that passes through the first pixels 120 and travels in the second direction D2 passes through the non-opening portions 140 and reaches the driver's seat. Meanwhile, when the state of the film 131 is in the light shielding state, the light L11 that passes through the first pixels 120 and travels in the first direction D1 passes through the openings 141 and reaches the passenger seat. However, the light L12 that passes through the first pixels 140 and travels in the second direction D2 does not pass through the non-opening portions 140 and does not reach the driver's seat.

The openings 141 are disposed on the optical path that passes through the second pixels 121 and travels in the second direction D2. The non-opening portions 140 are disposed on the optical path that passes through the second pixels 121 and travels in the first direction D1. Therefore, when the state of the film 131 is in the transmission state, the light L22 that passes through the second pixels 121 and travels in the second direction D2 passes through the openings 141 and reaches the driver's seat. Further, the light L21 that passes through the second pixels 121 and travels in the first direction D1 passes through the non-opening portions 140 and reaches the passenger seat. Meanwhile, when the state of the film 131 is in the light shielding state, the light L22 that passes through the second pixels 121 and travels in the second direction D2 passes through the openings 141 and reaches the driver's seat. However, the light L21 that passes through the second pixels 121 and travels in the first direction D1 does not pass through the non-opening portions 140 and does not reach the passenger seat.

When the ultraviolet light source 132 is turned off, the state of the film 131 becomes the transmission state, and the barrier that shields visible light disappears. Therefore, as described above, the light L11 that passes through the first pixels 120 and travels in the first direction D1 passes through the openings 141 and reaches the passenger seat. Further, the light L12 that passes through the first pixels 120 and travels in the second direction D2 passes through the non-opening portions 140 and reaches the driver's seat. Further, the light L22 that passes through the second pixels 121 and travels in the second direction D2 passes through the openings 141 and reaches the driver's seat. Further, the light L21 that passes through the second pixels 121 and travels in the first direction D1 passes through the non-opening portions 140 and reaches the passenger seat. Therefore, both the images displayed by the first pixels 120 and the image displayed by the second pixels 121 can be viewed from both the passenger seat and the driver's seat. Therefore, the same wide viewing angle, high resolution, and high luminance as in an ordinary display device can be obtained.

Meanwhile, when the ultraviolet light source 132 is turned on, the state of the film 131 becomes the light shielding state, and the barrier that shields visible light appears. Therefore, as described above, the light L11 that passes through the first pixels 120 and travels in the first direction D1 passes through the openings 141 and reaches the passenger seat. However, the light L12 that passes through the first pixels 120 and travels in the second direction D2 does not pass through the non-opening portions 140 and does not reach the driver's seat. Further, the light L22 that passes through the second pixels 121 and travels in the second direction D2 passes through the openings 141 and reaches the driver's seat. However, the light L21 that passes through the second pixels 121 and travels in the first direction D1 does not pass through the non-opening portions 140 and does not reach the passenger seat. Therefore, the viewing angle becomes narrow, and while the image which is displayed by the first pixels 120 can be visually recognized from the passenger seat, the image cannot be visually recognized from the driver's seat. Also, while the image displayed by the second pixels 121 can be visually recognized from the driver's seat, the image cannot be visually recognized from the passenger seat.

For configurations not described, the configuration adopted in the display device 1 of Embodiment 1 is also adopted in the display device 4 of Embodiment 4. The configuration adopted in the modification of the display device 1 of Embodiment 1 may be adopted in the display device 4 of Embodiment 4. For example, the display device 4 may be a display device other than the vehicle-mounted display device.

According to the invention of Embodiment 4, as in the same with the invention of Embodiment 1, the number of elements between the display panel 10 and the film 131 serving as a barrier that shields visible light can be reduced. Accordingly, the barrier can be brought closer to the display panel 10. Accordingly, the display device 4 capable of switching the viewing angle between a wide viewing angle and a narrow viewing angle, and suppressing the viewing angle from becoming excessively narrow when the viewing angle is switched to the narrow viewing angle is provided.

Further, according to the invention of Embodiment 4, as in the same with the invention of Embodiment 1, the first ultraviolet absorption layer 134 that absorbs ultraviolet light is disposed on the first main surface 130a of the ultraviolet light guide plate 130 so as to be superimposed on the film 131, and the second ultraviolet absorption layer 135 that absorbs ultraviolet light is disposed on the second main surface 130b of the ultraviolet light guide plate 130. Accordingly, the state of the film 131 is suppressed from becoming the light shielding state by the film 131 being irradiated with ultraviolet light contained in the light emitted from the backlight 12, external light, and the like. Thereby the appearance of a barrier that shields visible light by the ultraviolet light is suppressed.

5. Embodiment 5

Figure 5:
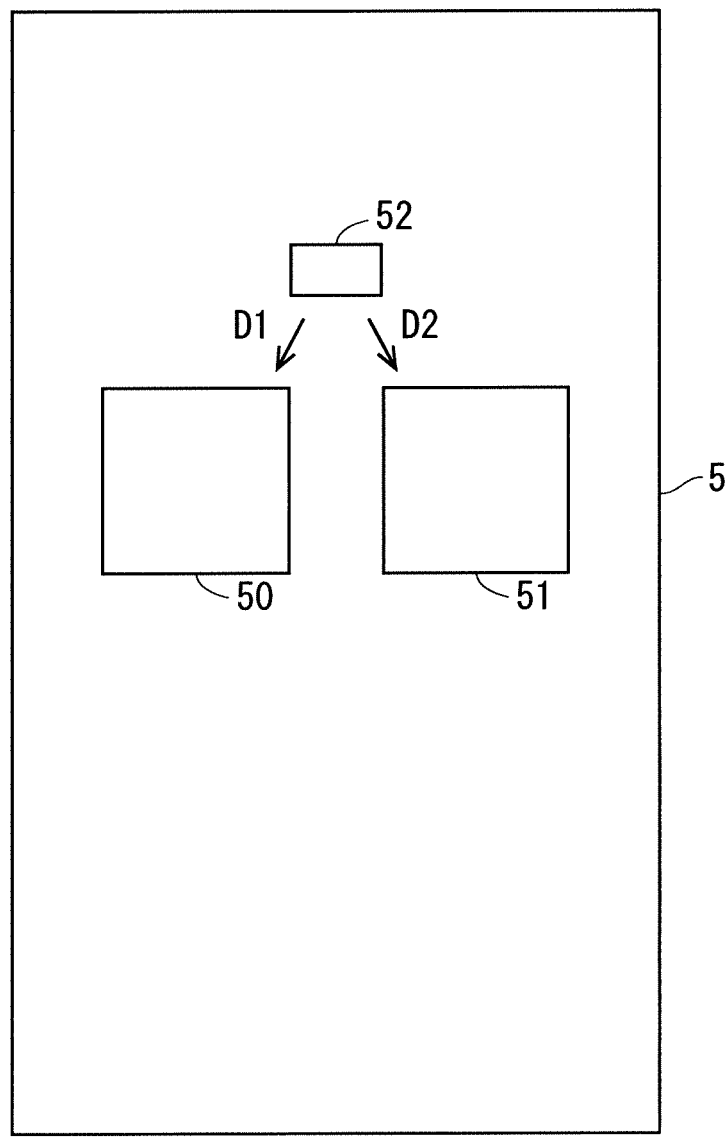
FIG. 5 is a plan view schematically illustrating an automobile of Embodiment 5.

FIG. 5 is a plan view schematically illustrating an automobile of Embodiment 5.

The automobile 5 of Embodiment 5 illustrated in FIG. 5 includes a driver's seat 51, a passenger seat 50, and a display device 52.

The display device 52 is the display device 1 of Embodiment 1, the display device 2 of Embodiment 2, the display device 3 of Embodiment 3, or the display device 4 of Embodiment 4.

The first pixels 120 are pixels for displaying an image that is visually recognized when the display panel 10 is observed from the passenger seat direction. The second pixels 121 are pixels for displaying an image that is visually recognized when the display panel 10 is observed from the driver's seat direction. The first direction D1 is the passenger seat direction. The second direction D2 is the driver's seat direction. The first pixels 120 may be pixels for displaying an image that is visually recognized when the display panel 10 is observed from the driver's seat direction. And, the second pixels 121 may be pixels for displaying an image that is visually recognized when the display panel 10 is observed from the passenger seat direction. The first direction. D1 may be the driver's seat direction. And the second direction D2 may be the passenger seat direction.

It should be noted that Embodiments of the present invention can be arbitrarily combined and can be appropriately modified or omitted without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A display device comprising:
    a display panel including pixels;
    an ultraviolet light guide plate that is superimposed on the display panel and has a first main surface on a side where the pixels are disposed, a second main surface on a side opposite to the side on which the pixels are disposed, and an end surface;
    a film disposed on the first main surface, having openings disposed on an optical path that passes through the pixels and travels in a first direction and non-opening portions disposed on an optical path that passes through the pixels and travels in a second direction different from the first direction, and made of a photochromic photosensitive material; and
    an ultraviolet light source irradiating the end surface with ultraviolet light,
    wherein a state of the film is changed from a transmission state in which visible light is transmitted to a light shielding state in which the visible light is absorbed, when the ultraviolet light source irradiates the end surface with ultraviolet light.

2. The display device according to claim 1, wherein
    the pixels include first pixels,
    the display panel further includes second pixels,
    the openings are disposed on an optical path that passes through the second pixels and travels in the second direction, and
    the non-opening portions are disposed on an optical path that passes through the second pixels and travels in the first direction.

3. The display device according to claim 1, wherein
    the display panel is a liquid crystal panel, and includes a liquid crystal cell and a polarizing plate superimposed on the liquid crystal cell, and
    the ultraviolet light guide plate and the film are sandwiched between the liquid crystal cell and the polarizing plate.

4. The display device according to claim 1, further comprising
    a first ultraviolet absorption layer disposed on the first main surface so as to be superimposed on the film and a second ultraviolet absorption layer disposed on the second main surface.

5. The display device according to claim 1, wherein
    the ultraviolet light source irradiates a first region of the end surface with ultraviolet light, and
    the display device further comprises an ultraviolet reflection film disposed in a second region different from the first region of the end surface.

6. An automobile comprising:
    a driver's seat;
    a passenger seat; and
    the display device according to claim 1, wherein
    the first direction is a direction from the display device to one of the driver's seat and the passenger seat, and
    the second direction is a direction from the display device to an other of the driver's seat and the passenger seat.

* * * * *